E. GURNEY.
BALL SOCKET FASTENER.
APPLICATION FILED APR. 17, 1916
1,314,645.
Patented Sept. 2, 1919.
FIGURE I.
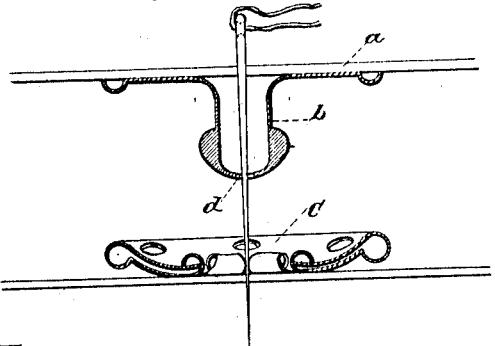
FIGURE II.
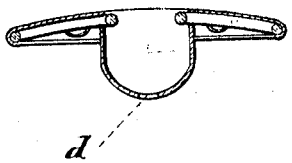
FIGURE III.
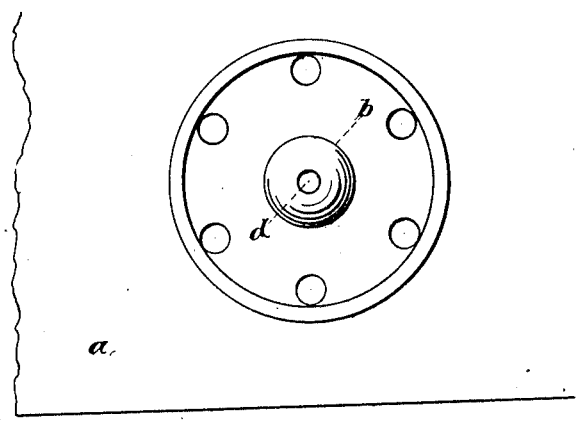
Edmund Gurney
INVENTOR.
WITNESSES:
Franz Deggendorfer

UNITED STATES PATENT OFFICE.

EDMUND GURNEY, OF PORTLAND, OREGON.

BALL-SOCKET FASTENER.

1,314,645.   Specification of Letters Patent.   Patented Sept. 2, 1919.

Application filed April 17, 1916. Serial No. 91,745.

*To all whom it may concern:*

Be it known that I, EDMUND GURNEY, a citizen of the United States, residing at the city of Portland, in the county of Multnomah and State of Oregon, have invented a new and useful Improvement in Ball-Socket Fasteners, of which the following is a specification.

My improvement relates to ball-socket fasteners.

The nature of the improvement, for which Letters Patent are hereby prayed, is solely the provision of a hole in the center of the ball of the male parts and a hole in the center of solid centered female parts of any ball socket fastener for the purpose of pulling through a threaded needle or other pointed instrument to quickly and unerringly center the female part of the fastener. Whereas it has frequently been found to be impossible to exactly match the centers of male and female parts of ball socket fasteners of any kind in attaching to cloth or other materials, thereby very often having caused unsightliness by pulling of the cloth out of shape and necessitating very often the removal of the female part of the fastener more than once and consequently through such repeated trials to closely approximate the location of the centers, loss of time is occasioned. This my improvement obviates the foregoing described difficulty and time loss by simply providing the ball of the male part and also the socket of female parts having solid centers on the center with a hole sufficiently large to stick a needle through.

To further elucidate the value of this my improvement in ball socket fasteners the following is a description of procedure of operation, viz:

The operator after having decided the location of the fastener proceeds to attach the male part to the cloth in the usual way, then from the reverse side of the cloth he stitches with a threaded needle through the cloth, the male part of the fastener now attached to the cloth, and through the cloth whereon the female part of the fastener is to be affixed; he now pulls the thread through far enough to permit him to separate the two pieces of cloth and places the center of the female part over the point where the needle and thread has pierced the cloth being the exact center for the female part of the fastener in conformity with the center of the male part. It will be noted that this is done expeditiously and absolutely correct without necessitating further trials, in contradistinction to the present mode of doing this, where it is necessary for the operator to feel through the cloth to approximate as closely as possible the location of the center, very often resulting in eccentricity of the two parts that must be remedied by another trial or trials, unless the pulling of the cloth, unsightly wrinkles and discomfort are no object.

Referring to the accompanying drawings, Figure I. shows a cross-section through the center of an ordinary ball-socket fastener, upper part the male and lower part female, as may be used to fasten any kind of cloth, leather, canvas, blankets, etc. The letter "$a$" refers to the particular kind of material to be fastened together shown also in section.

The letter "$b$" denotes the raised part of the fastener usually called the male.

The letter "$c$" denotes simply the counterpart or female part of fastener having an open center.

The letter "$d$" refers and points to the hole in the top of the male part of the fastener (the sole feature of the improvement) through which a threaded needle appears drawn to emphasize the purpose.

Fig. II. is the sectional view of the female part of a ball socket fastener having a closed solid socket.

Letter "$d$" again denotes the aperture or hole in the center of the socket.

Fig. III. is simply the top view or plan of the male part of ball socket fastener in which:

The letter "$a$" again denotes the particular kind of material to be fastened together in plan;

The letter "$b$" again denotes the raised part of the fastener usually called the male, and The letter "$d$" again denotes the hole in the top of the male part of the fastener.

There is no feature in the construction of ball socket fastener whereto my improvement refers, excepting solely the providing of a hole or aperture at the top in the center of the ball of the male part of such fasteners and of a hole in center of the socket of the female part of ball socket fasteners with solid centers.

Having thus described my invention, what I claim as new is:

1. In means of the class described, the combination with a pair of coöperating members each having a centralizing aperture, said apertures being adapted to coincide when said members are arranged in coöperating position, of penetrating means adapted to be temporarily introduced through said apertures when one of the members has been arranged in a desired position to determine the proper location at which its coacting member must be held during attachment.

2. In means of the class described, the combination with coöperating elements, one of which consists of a headed member and the other a socket member adapted to receive said headed member, said members being formed with corresponding coinciding apertures for obtaining registry of the parts, of a penetrating member adapted to be introduced through said apertures when one of the members has been attached to determine the proper relative position of and hold the other member during fastening in place, each of said members being provided with openings to receive the fastening means.

3. As a new article of manufacture, a snap fastener consisting of coöperating members comprising a stud, the terminus of which is formed with a restricted aperture, and a button provided with a socket element to receive the stud and with a central aperture in said socket element coinciding in area and position with the aperture of the stud.

4. In the art of dress making, the method of alining of the respective members of ball and socket fasteners which consists in applying to a piece of cloth one element of said fasteners in substantially the position which said element will retain when in use, laying against said element the piece of cloth which is to carry the other element of said fastener, and then introducing through the center of the first named element a member adapted to engage the juxtaposed piece of cloth whereby to indicate on the latter the proper centralized position at which the second element of the ball and socket fastener is to be attached to said cloth for proper centralization with respect to the first named element preliminary to being permanently applied to the said juxtaposed piece of cloth.

5. In the art of dress making, the method of alining the respective members of ball and socket fasteners which consists in applying to a piece of cloth one element of said fasteners, introducing through a centralizing opening a member adapted to penetrate and thereby mark a piece of cloth which is to carry the other element of said fastener when said last named piece of cloth is juxtaposed with respect to the first mentioned fastener element, thus denoting the proper centralized position on the juxtaposed piece of cloth at which the coöperating member of the ball and socket fastener must be secured to obtain the proper relative coöperative position of said ball and socket fastener members.

6. In the art of dress making, the method of alining the respective members of ball and socket fasteners which consists first in applying permanently to a piece of cloth the male member of such ball and socket fastener, disposing the female member thereon in operative position, then juxtaposing a second piece of cloth which is to carry the female member permanently in the position which said cloth will assume when the members of the fastener are properly secured together and to their respective pieces of cloth, then passing through centralizing openings formed in the male and female members a penetrating member whereby to engage the juxtaposed second piece of cloth at a point in alinement with the center of the female member, thereby denoting upon the juxtaposed cloth the proper centralized point at which the female member must be secured to such cloth, and finally stitching or otherwise fastening the female member in place at the indicated position.

EDMUND GURNEY.

Witnesses:
C. A. SHEPPARD,
FRANZ DEGGENDORFER.